(12) United States Patent
Zhang

(10) Patent No.: US 10,949,007 B2
(45) Date of Patent: Mar. 16, 2021

(54) TOUCH DISPLAY PANEL, DISPLAY APPARATUS, AND METHOD FOR DRIVING TOUCH DISPLAY PANEL

(71) Applicants: BOE Technology Group Co., Ltd., Beijing (CN); Ordos Yuansheng Optoelectronics Co., Ltd., Inner Mongolia (CN)

(72) Inventor: Jie Zhang, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 246 days.

(21) Appl. No.: 16/068,927

(22) PCT Filed: Dec. 15, 2017

(86) PCT No.: PCT/CN2017/116517
§ 371 (c)(1),
(2) Date: Jul. 10, 2018

(87) PCT Pub. No.: WO2018/209946
PCT Pub. Date: Nov. 22, 2018

(65) Prior Publication Data
US 2020/0174604 A1 Jun. 4, 2020

(30) Foreign Application Priority Data
May 18, 2017 (CN) .......................... 201710353151.9

(51) Int. Cl.
*G06F 3/041* (2006.01)
*G06F 3/044* (2006.01)

(52) U.S. Cl.
CPC .......... *G06F 3/0412* (2013.01); *G06F 3/0443* (2019.05); *G06F 3/04164* (2019.05); *G06F 3/04166* (2019.05)

(58) Field of Classification Search
CPC ..... G06F 3/0412; G06F 3/04166; G06F 3/044
See application file for complete search history.

(56) References Cited

U.S. PATENT DOCUMENTS 9,766,761 B2   9/2017  Wang et al.
2014/0184557 A1* 7/2014  Jeong ................... G06F 3/0443
                                                  345/174

(Continued)

FOREIGN PATENT DOCUMENTS

| CN | 104020891 A | 9/2014 |
| CN | 104680999 A | 6/2015 |
| CN | 104777942 A | 7/2015 |

OTHER PUBLICATIONS

Transmittal, International Search Report and Written Opinion for International Application No. PCT/CN2017/116517, dated Mar. 20, 2018, 16 pages.

*Primary Examiner* — Temesghen Ghebretinsae
*Assistant Examiner* — Sosina Abebe
(74) *Attorney, Agent, or Firm* — Westman, Champlin & Koehler, P.A.

(57) ABSTRACT

The present disclosure discloses a touch display panel, a display apparatus, and a method for driving the touch display panel. The touch display panel includes an upper substrate; a lower substrate disposed opposite to the upper substrate; a plurality of pixels located between the upper substrate and the lower substrate and arranged in a matrix; a driving chip configured to scan a plurality of pixels progressively; and a common electrode layer located between the upper substrate and the lower substrate and divided into a plurality of self-capacitance electrodes which (Continued)

are independent of each other, wherein the self-capacitance electrodes are connected to the driving chip through corresponding wires, wherein the driving chip is further configured to apply a common electrode signal to each row of self-capacitance electrodes only when pixels corresponding to the corresponding row of self-capacitance electrodes are in a scanning state.

17 Claims, 7 Drawing Sheets

(56) References Cited

U.S. PATENT DOCUMENTS

| | | | |
|---|---|---|---|
| 2014/0354592 A1* | 12/2014 | Kang | G06F 3/0416 |
| | | | 345/174 |
| 2016/0246408 A1 | 8/2016 | Wang et al. | |
| 2016/0313825 A1* | 10/2016 | Hotelling | G06F 3/0418 |
| 2016/0328075 A1 | 11/2016 | Luo | |
| 2016/0335973 A1* | 11/2016 | Chung | G09G 3/3648 |
| 2016/0357283 A1* | 12/2016 | Xu | G02F 1/133512 |
| 2017/0108976 A1 | 4/2017 | Ding et al. | |

* cited by examiner

TOUCH DISPLAY PANEL, DISPLAY APPARATUS, AND METHOD FOR DRIVING TOUCH DISPLAY PANEL

CROSS-REFERENCE TO RELATED APPLICATION(S)

This application is a US National Stage Application of PCT Application No. PCT/CN2017/116517, filed on Dec. 15, 2017, entitled "TOUCH DISPLAY PANEL, DISPLAY APPARATUS, AND METHOD FOR DRIVING TOUCH DISPLAY PANEL", which claims priority to the Chinese Patent Application No. 201710353151.9, filed on May 18, 2017, entitled "TOUCH DISPLAY PANEL, DISPLAY APPARATUS, AND METHOD FOR DRIVING TOUCH DISPLAY PANEL", both of which are incorporated herein by reference in their entireties.

TECHNICAL FIELD

The present disclosure relates to the field of display technology, and more particularly, to a touch display panel, a display apparatus, and a method for driving the touch display panel.

BACKGROUND

With the rapid development of display technology, touch screen panels have been gradually spreading in people's lives. Currently, touch screens may be divided into Add On Mode Touch Panels, On Cell Touch Panels, and In Cell Touch Panels according to composition structures. An Add on Mode Touch Panel is a Liquid Crystal Display (LCD) screen having a touch function which is produced by manufacturing a touch screen and an LCD screen separately, and then affixing them together. The Add on Mode Touch Panels have disadvantages such as a high production cost, a low light transmittance, a thick module etc. An In Cell Touch Panel embeds a touch electrode of a touch screen in an LCD screen, which can not only reduce an overall thickness of the module, but also can greatly reduce the production cost of the touch screen, and is favored by various panel manufacturers.

SUMMARY

Some embodiments of the present disclosure provide a touch display panel, a display apparatus, and a method for driving the touch display panel.

According to some embodiments of the present disclosure, there is provided a touch display panel, comprising: an upper substrate; a lower substrate disposed opposite to the upper substrate; a plurality of pixels located between the upper substrate and the lower substrate and arranged in a matrix; a driving chip configured to scan a plurality of pixels progressively; and a common electrode layer located between the upper substrate and the lower substrate and divided into a plurality of self-capacitance electrodes which are independent of each other, wherein the self-capacitance electrodes are connected to the driving chip through corresponding wires, wherein the driving chip is further configured to apply a common electrode signal to each row of self-capacitance electrodes only when pixels corresponding to the corresponding row of self-capacitance electrodes are in a scanning state.

In a possible implementation, each row of self-capacitance electrodes corresponds to multiple rows of pixels.

In a possible implementation, in the touch display panel according to some embodiments of the present disclosure, various rows of self-capacitance electrodes correspond to the same number of rows of pixels.

In a possible implementation, the touch display panel according to some embodiments of the present disclosure further comprises: a plurality of compensation resistors electrically connected to the plurality of wires, respectively, and a resistance value of each compensation resistor is inversely related to a length of a corresponding wire.

In a possible implementation, the touch display panel according to some embodiments of the present disclosure further comprises: a plurality of compensation capacitors coupled to the plurality of wires, respectively, and a capacitance value of each compensation capacitor is inversely related to a length of a corresponding wire.

In a possible implementation, in the touch display panel according to some embodiments of the present disclosure, first electrodes of the compensation capacitors are arranged in the same layer as that of the wires.

In a possible implementation, in the touch display panel according to some embodiments of the present disclosure, a portion of a wire is multiplexed as a first electrode of a corresponding compensation capacitor.

In a possible implementation, in the touch display panel according to some embodiments of the present disclosure, the wires are disposed in a different layer from that of the self-capacitance electrodes, and second electrodes of the compensation capacitors are disposed in the same layer as that of the self-capacitance electrodes.

In a possible implementation, in the touch display panel according to some embodiments of the present disclosure, the wires are disposed in the same layer as that of the self-capacitance electrodes, and second electrodes of the compensation capacitors are disposed in a different layer from that of the self-capacitance electrodes.

In a possible implementation, the touch display panel according to some embodiments of the present disclosure further comprises: data lines extending in the same direction as that of the wires.

In a possible implementation, in the touch display panel according to some embodiments of the present disclosure, the wires are disposed in the same layer as that of the data lines and are insulated from the data lines.

In a possible implementation, in the touch display panel according to some embodiments of the present disclosure, the driving chip is further configured to determine a touch position by detecting a change in a capacitance value of each self-capacitance electrode during touching.

A display apparatus according to some embodiments of the present disclosure comprises the touch display panel according to the embodiments of the present disclosure.

A method for driving a touch display panel according to some embodiments of the present disclosure comprises:

during displaying, scanning pixels in the touch display panel progressively, and applying a common electrode signal to each row of self-capacitance electrodes only when pixels corresponding to the corresponding row of self-capacitance electrodes are scanned.

In a possible implementation, the method according to some embodiments of the present disclosure further comprises: during touching, determining a touch position by detecting a change in a capacitance value of each self-capacitance electrode.

In a possible implementation, in the method according to some embodiments of the present disclosure, each row of self-capacitance electrodes corresponds to n rows of pixels, where n is an integer greater than or equal to 1, and the method further comprises:

during displaying, scanning pixels in the touch display panel progressively, and applying a common electrode signal to each row of self-capacitance electrodes only when n rows of pixels corresponding to the corresponding row of self-capacitance electrodes are scanned.

BRIEF DESCRIPTION OF THE ACCOMPANYING DRAWINGS

DETAILED DESCRIPTION

In order to make the purposes, technical solutions, and advantages of the present disclosure more clear, the present disclosure will be further described in detail below with reference to the accompanying drawings. It is obvious that the embodiments described are merely some but not all of the embodiments of the present disclosure. All other embodiments obtained by those of ordinary skill in the art based on the embodiments of the present disclosure without any creative effort shall fall within the protection scope of the present disclosure.

Shapes and sizes of various components in the accompanying drawings do not reflect true scale and are only intended to illustrate the present disclosure.

Specific implementations of the touch display panel, the display apparatus, and the method for driving the touch display panel according to the embodiments of the present disclosure will be described in detail below with reference to the accompanying drawings.

Figure 1:
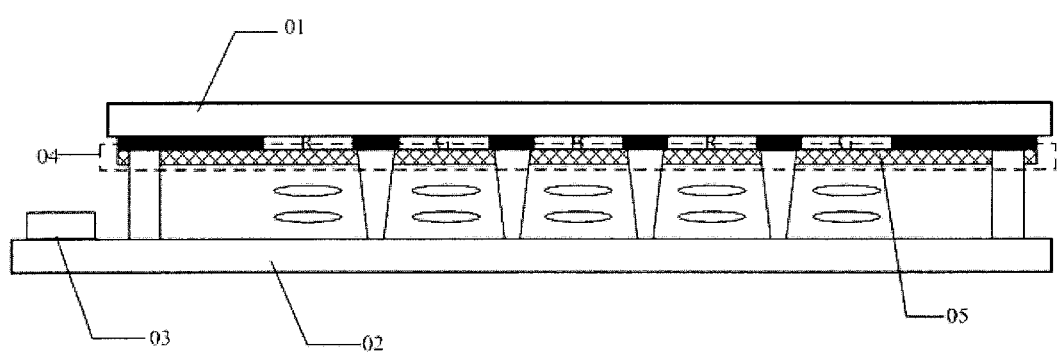
FIG. 1 is an exemplary structural diagram of a touch display panel according to an embodiment of the present disclosure.
Figure 2:
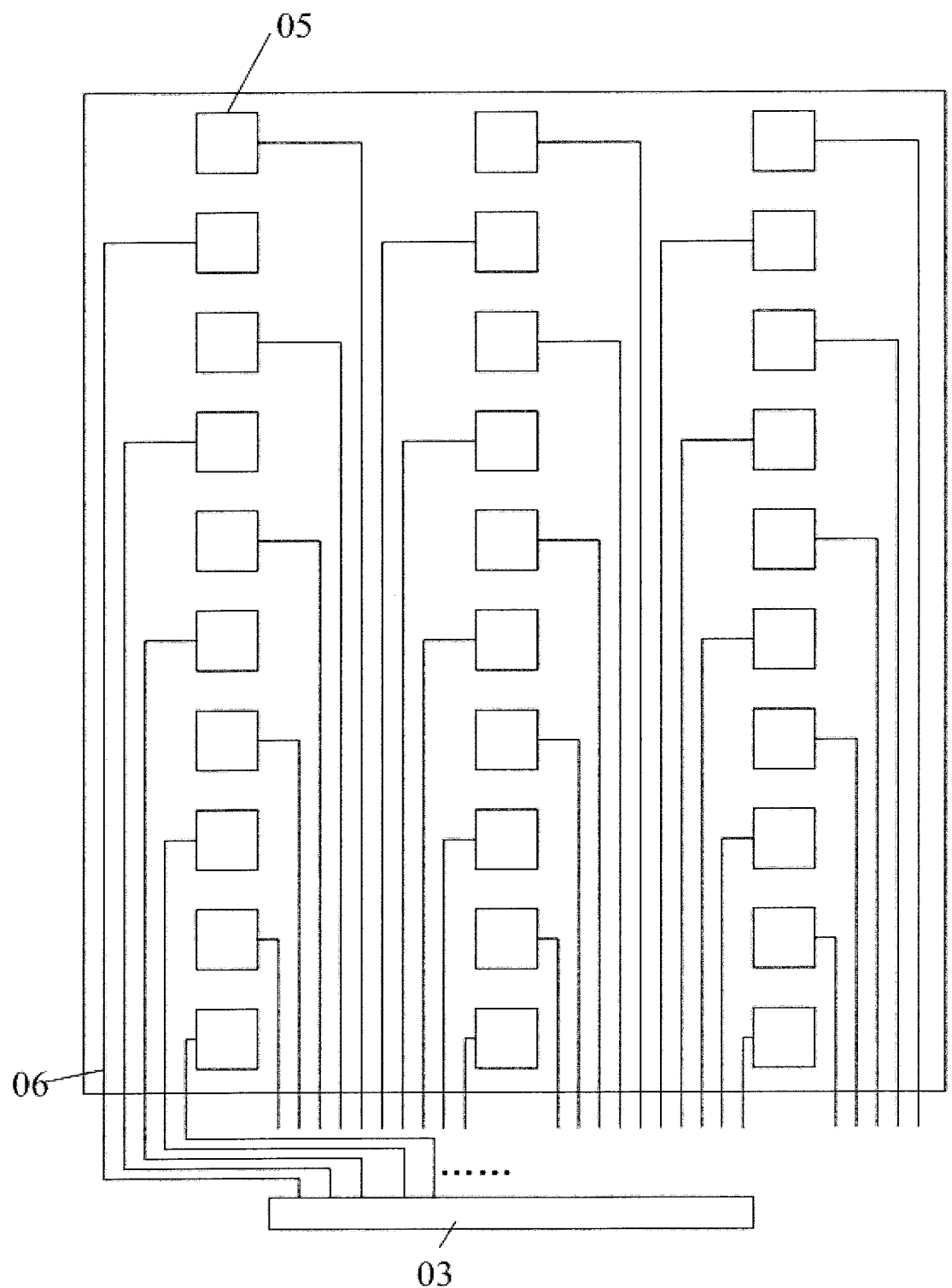
FIG. 2 is an exemplary top view of a touch display panel according to an embodiment of the present disclosure.

In some embodiments of the present disclosure, there is provided a touch display panel. As shown in FIGS. 1 and 2, the touch display panel comprises an upper substrate 01, a lower substrate 02 and a driving chip 03 disposed opposite to the upper substrate 01, a plurality of pixels located between the upper substrate 01 and the lower substrate 02 and arranged in a matrix, and a common electrode layer 04, wherein the common electrode layer 04 is divided into a plurality of self-capacitance electrodes 05 which are independent of each other, the self-capacitance electrodes 05 are connected to the driving chip 03 through corresponding wires 06, and each row of self-capacitance electrodes 05 corresponds to multiple rows of pixels; and the driving chip 03 is configured to scan the pixels progressively, and apply a common electrode signal to each row of self-capacitance electrodes 05 only when pixels corresponding to the corresponding row of self-capacitance electrodes 05 are in a scanning state. In addition, in other embodiments, the driving chip 03 may also be disposed at a position other than a position on the lower substrate 02. In other words, the driving chip 03 is not limited to being disposed opposite to the upper substrate 01. In addition, in some other embodiments, each row of self-capacitance electrodes 05 may also correspond to a single row of pixels.

Figure 3:
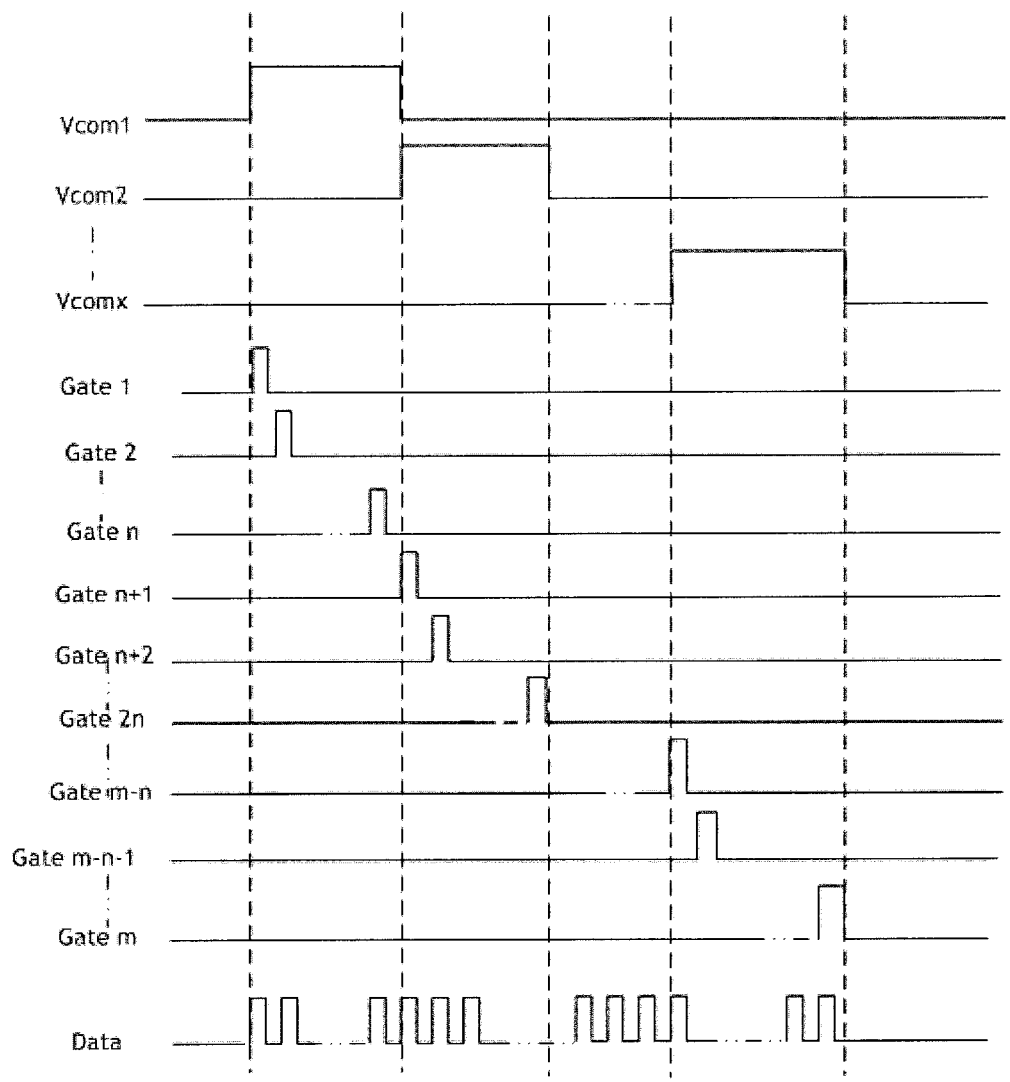
FIG. 3 is a diagram of a driving timing of a touch display panel in a display phase according to an embodiment of the present disclosure.

For example, by taking a row of self-capacitance electrodes corresponding to n rows of pixels as an example, during displaying, a driving timing of the touch display panel may be as shown in FIG. 3. When pixels in first to $n^{th}$ rows are scanned, the driving chip 3 applies a common voltage signal Vcom1 to a first row of self-capacitance electrodes. Similarly, when pixels in an $(n+1)^{th}$ to $(2n)^{th}$ rows are scanned, the driving chip 3 may apply a common voltage signal Vcom2 to a corresponding row of self-capacitance electrodes. When pixels in $(xn-n+1)^{th}$ to $(xn)^{th}$ rows are scanned, the driving chip 3 may apply a common voltage signal Vcomx to a corresponding row of self-capacitance electrodes. That is, a common electrode signal is applied to each row of self-capacitance electrodes only when pixels corresponding to the corresponding row of self-capacitance electrodes are in a scanning state. Here, scanning pixels in an $n^{th}$ row means applying a scanning signal to a gate line corresponding to the row of pixels, and applying a data signal to a data line Data corresponding to the row of pixels.

The touch display panel according to some embodiments of the present disclosure may comprise an upper substrate, a lower substrate disposed opposite to the upper substrate, a driving chip, a plurality of pixels located between the upper substrate and the lower substrate and arranged in a matrix, and a common electrode layer. Here, the common electrode layer is divided into a plurality of self-capacitance electrodes which are independent of each other, the self-capacitance electrodes are connected to the driving chip through corresponding wires, and each row of self-capacitance electrodes may correspond to multiple rows of pixels; and the driving chip is configured to scan the pixels progressively, and apply a common electrode signal to each row of self-capacitance electrodes only when pixels corresponding to the corresponding row of self-capacitance electrodes are in a scanning state. A timing of applying a common electrode signal to various rows of self-capacitance electrodes is controlled, that is, a common electrode signal is applied to each row of self-capacitance electrodes only when pixels corresponding to the corresponding row of self-capacitance electrodes are scanned, which reduces an amount of data required to be processed by the driving circuit, thereby simplifying a design of the driving circuit and saving the production cost.

In addition, there is no need to add an additional film layer to the touch display panel according to some embodiments of the present disclosure, and it only needs to pattern the original common electrode layer which is disposed as a whole to form patterns of corresponding self-capacitance electrodes, which saves the production cost and increases the production efficiency.

Generally, a density of touch electrodes on a touch screen is usually on the order of millimeters. Therefore, in a specific implementation, a density of various "self-capacitance electrodes" and an occupied area thereof may be selected according to a desired touch density to ensure the desired touch density. For example, each "self-capacitance electrode" is designed as a square electrode of about 5 mm*5 mm, and a density of pixels on a display screen is usually on the order of micrometers. Therefore, a self-capacitance electrode may generally correspond to a plurality of pixel units in the display screen. In addition, the touch display panel according to some embodiments of the present disclosure divides the existing common electrode layer which is disposed on the upper substrate as a whole into a plurality of self-capacitance electrodes and corresponding wires.

In a specific implementation, in order to facilitate cutting the common electrode layer to obtain self-capacitance electrodes which are arranged regularly, in the touch display panel according to some embodiments of the present disclosure, various rows of self-capacitance electrodes correspond to the same number of rows of pixels.

Figure 4:
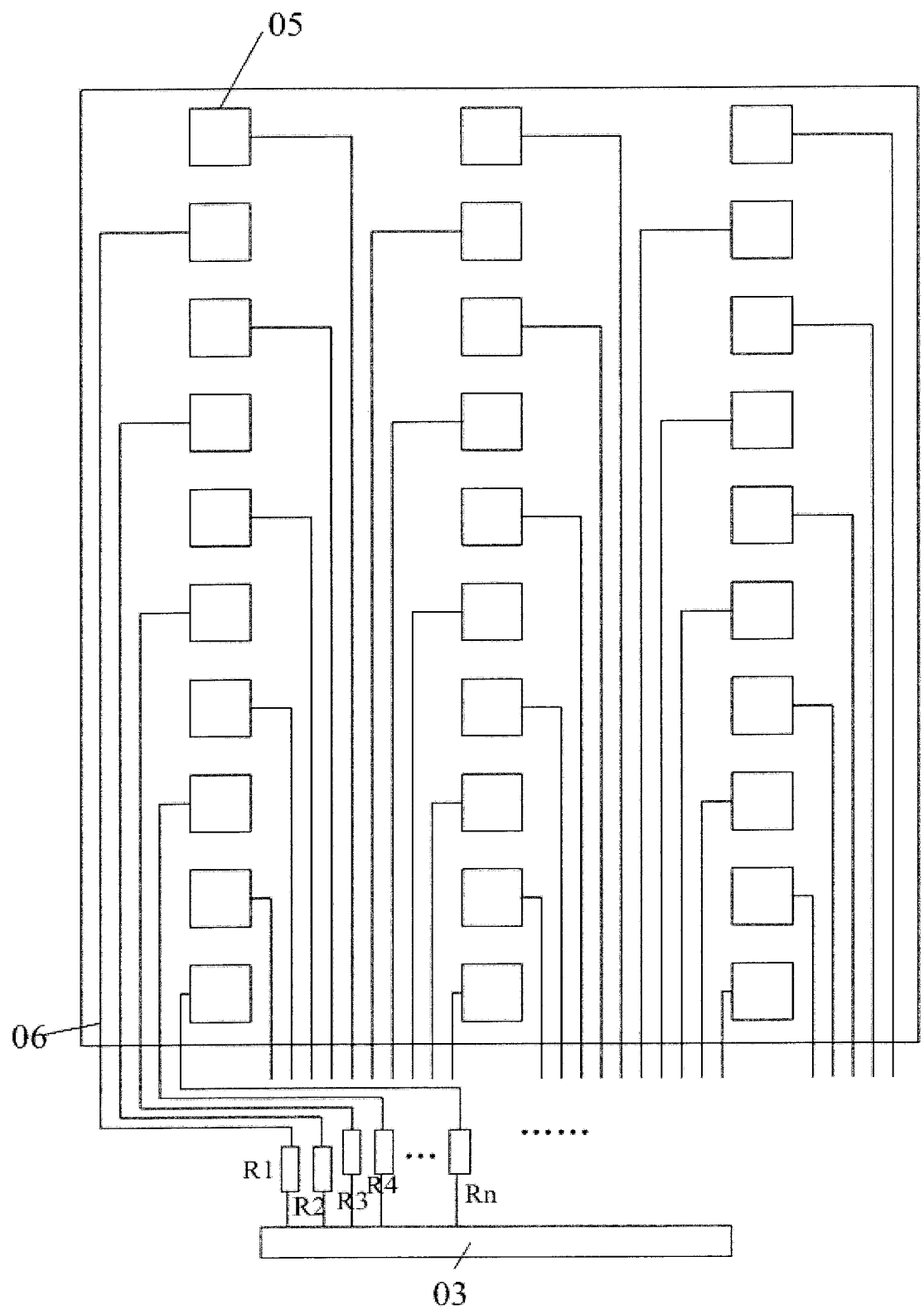
FIG. 4 is another structural diagram of a touch display panel according to an embodiment of the present disclosure.

Further, in the touch display panel according to some other embodiments of the present disclosure, as shown in FIG. 4, there are further included a plurality of compensation resistors Rn electrically connected to the plurality of wires 06, respectively, and a resistance value of each compensation resistor Rn may be inversely related to a length of a corresponding wire 06. That is, the longer the wire, the smaller the resistance value of the compensation resistor Rn connected to the wire. The compensation resistors are connected to the wires, which improves the difference in the output loads due to the difference in the lengths of the wires connected between the driving chip and the self-capacitance electrodes, thereby improving the display uniformity.

In some embodiments, the resistance values of the compensation resistors are preset according to the difference in the output loads of various wires by applying a common electrode signal to each wire and detecting the difference in the output loads of various wires. Compensation resistors having corresponding resistance values are then set, so that a sum of a resistance value of each wire and a resistance value of a resistor connected to the wire is constant, thereby improving the display uniformity.

Figure 5:
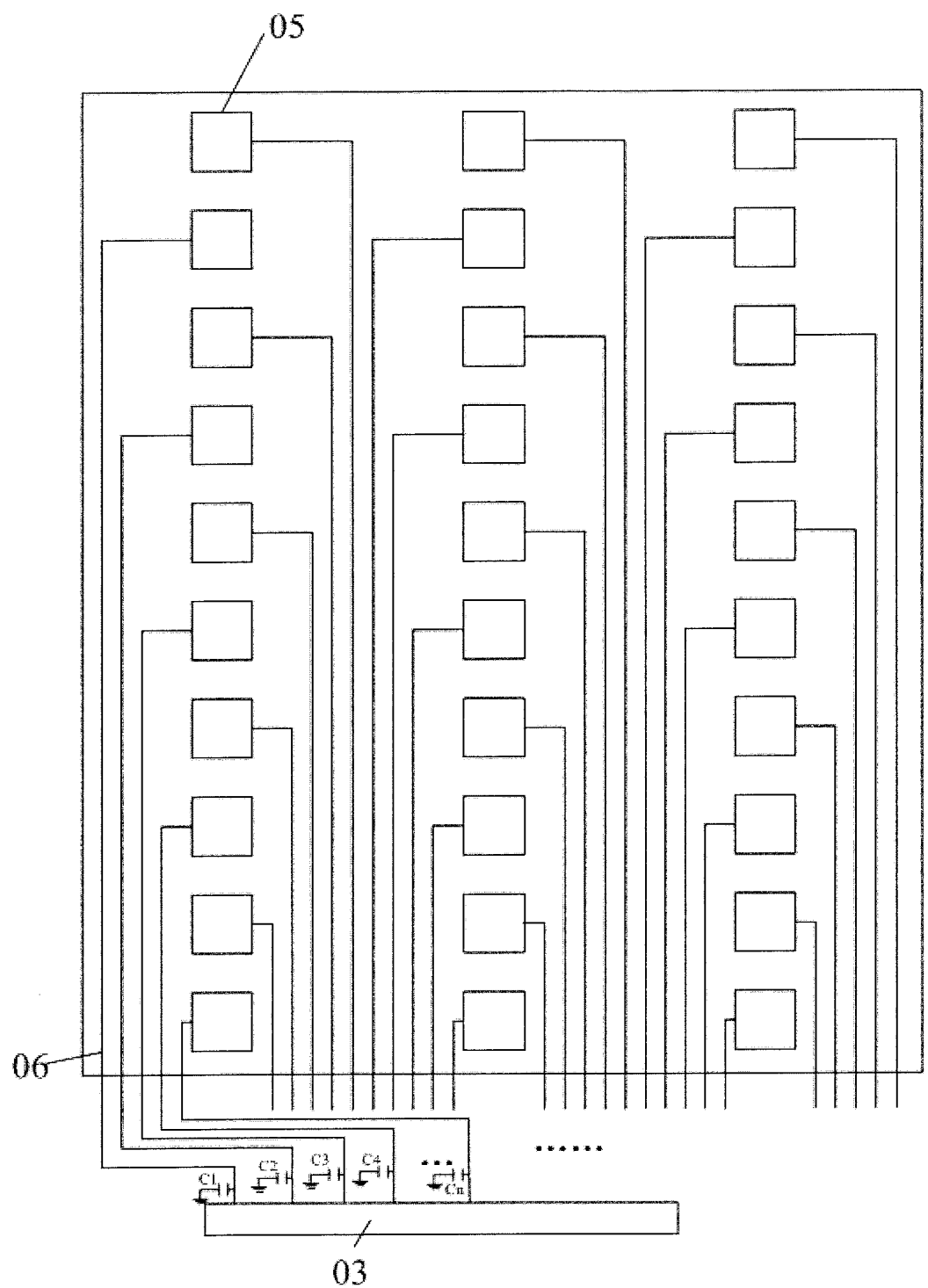
FIG. 5 is another structural diagram of a touch display panel according to an embodiment of the present disclosure.

Further, in the touch display panel according to some other embodiments of the present disclosure, as shown in FIG. 5, there are further included a plurality of compensation capacitors Cn coupled to the plurality of wires 06, respectively, and a capacitance value of each compensation capacitor Cn is inversely related to a length of a corresponding wire 06, wherein the compensation capacitors Cn each comprise a first electrode and a second electrode. The compensation capacitors are connected to the wires, which improves the difference in the output loads due to the difference in the lengths of the wires connected between the driving chip and the self-capacitance electrodes, thereby improving the display uniformity.

In some embodiments, the capacitance values of the compensation capacitors are preset by obtaining the capacitance values through tests, and then compensation capacitors having the corresponding capacitance values are set according to the obtained values, so that various wires have the same load, thereby improving the display uniformity.

Figure 6:
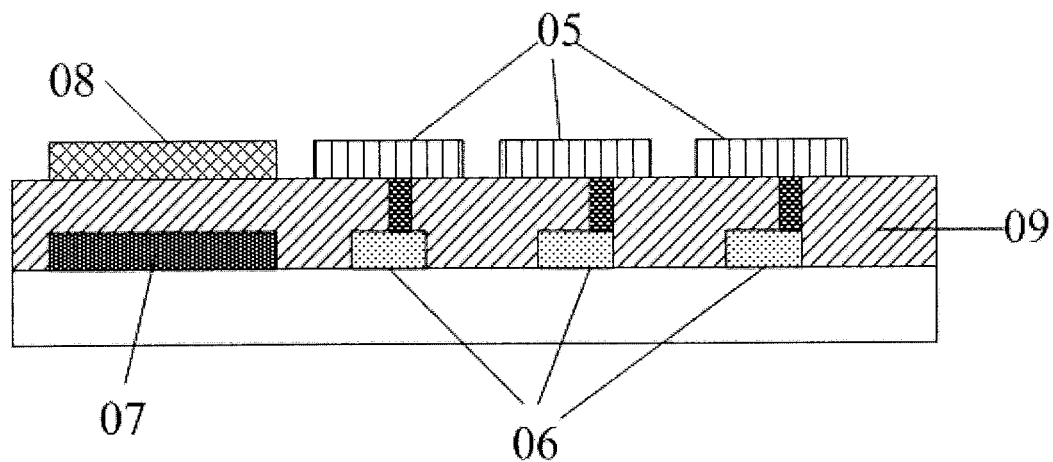
FIG. 6 is another structural diagram of a touch display panel according to an embodiment of the present disclosure.

In order to simplify the process steps, as shown in FIG. 6, in the touch display panel according to some embodiments of the present disclosure, first electrodes 07 of the compensation capacitors are disposed in the same layer as that of the wires 06, and an insulating layer 09 is disposed above the first electrodes 07 and the wires 06; and the self-capacitance electrodes 05 are disposed in the same layer as that of the second electrodes 08, and the self-capacitance electrodes 05 are connected to the wires 06 through via holes. In this way, there is no need to separately add a preparation process of the first electrodes during preparation, and it only needs to change a pattern of a film layer corresponding to the original wires, which simplifies the process steps, saves the production cost, and improves the production efficiency.

Figure 7A:
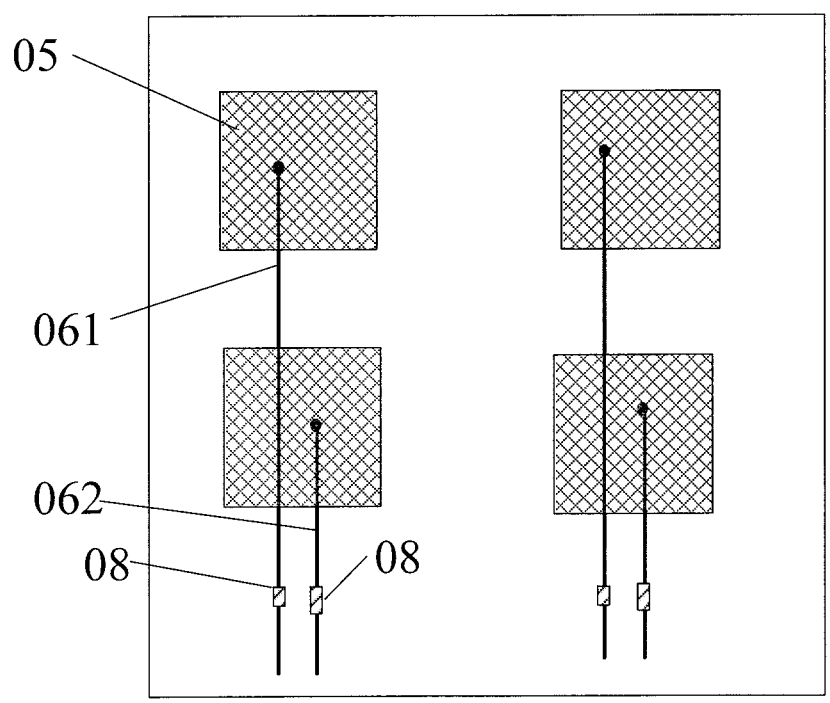
FIG. 7a is another structural diagram of a touch display panel according to an embodiment of the present disclosure.
Figure 7B:
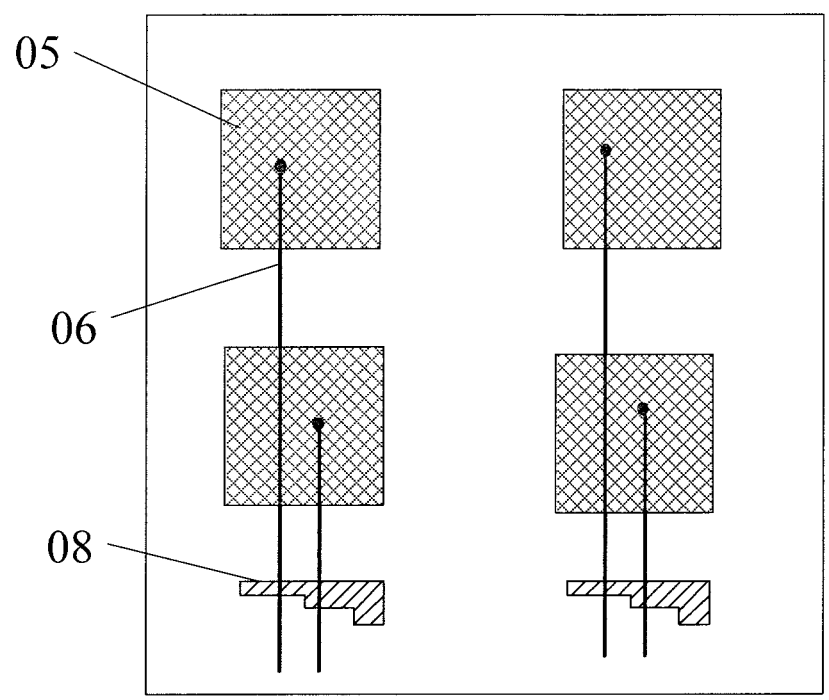
FIG. 7b is another structural diagram of a touch display panel according to an embodiment of the present disclosure.

In addition, in order to save the process steps of fabricating the first electrodes, as shown in FIGS. 7a and 7b, in the touch display panel according to some embodiments of the present disclosure, a portion of a wire 06 is multiplexed as a first electrode, i.e., a compensation capacitor is formed by a wire and a second electrode 08. In some embodiments of the present disclosure, as shown in FIG. 7a, for a wire 061 of a long length, an area of a second electrode 08 disposed above the wire 061 is small, and for a wire 062 of a short length, an area of a second electrode 08 disposed above the wire 062 is large, thereby forming compensation capacitors of different sizes. In some other embodiments of the present disclosure, as shown in FIG. 7b, the second electrodes 08 are arranged in a stepped shape, so that the second electrodes 08 above the wires 06 of different lengths have different areas, thereby forming compensation capacitors of different sizes.

As shown in FIG. 6, in the touch display panel according to some embodiments of the present disclosure, when the wires 06 are disposed in a different layer from that of the self-capacitance electrodes 05, in order to further simplify the process steps, the second electrodes 08 are disposed in the same layer as that of the self-capacitance electrodes 05. In this way, there is no need to separately add a preparation process of the second electrodes during preparation, and it only needs to change a pattern of a film layer corresponding to the original self-capacitance electrodes, which simplifies the process steps, saves the production cost, and improves the production efficiency.

In the touch display panel according to some embodiments of the present disclosure, when the wires are disposed in the same layer as that of the self-capacitance electrodes, as the first electrodes are disposed in the same layer as that of the wires or are multiplexed by the wires, in order to ensure that the first electrodes and the second electrodes have a large facing area, the second electrodes are disposed in a different layer from that of the self-capacitance electrodes.

In addition, in the touch display panel according to some embodiments of the present disclosure, there are further included data lines, wherein an extension direction of the wires is the same as that of the data lines.

In the touch display panel according to some embodiments of the present disclosure, the wires are disposed in the same layer as that of the data lines and are insulated from the data lines. In this way, there is no need to separately add a preparation process of the wires during preparation, and it only needs to change a pattern of a film layer corresponding to the original data wires, which simplifies the process steps, saves the production cost, and improves the production efficiency.

Further, in the touch display panel according to some embodiments of the present disclosure, the driving chip is further configured to, during touching, apply a touch scanning signal to each "self-capacitance electrode", and determine a touch position by detecting a change in a capacitance value of each "self-capacitance electrode". A specific principle is that when a human body does not touch the screen, each "self-capacitance electrode" has a fixed capacitance value, and when the human body touches the screen, the corresponding self-capacitance electrode has a capacitance value which is equal to a fixed capacitance value plus a capacitance value of the human body, and the driving chip may determine a touch position by detecting a change in a capacitance value of each "self-capacitance electrode" in a timing period of the touch.

In some embodiments, the driving chip may apply a touch scanning signal to the self-capacitance electrodes at the same time, or may apply the touch scanning signal to the self-capacitance electrodes progressively, which is not limited here. In some embodiments, the touch scanning signal may be a square wave signal.

In a specific implementation, the touch display panel according to some embodiments of the present disclosure divides the existing common electrode layer which is disposed as a whole into a plurality of self-capacitance electrodes, and in order not to affect the normal display function, when the common electrode layer is divided, a line where the division is performed is generally away from an opening region of the display and is disposed in a pattern region of a black matrix layer.

Specifically, the touch screen according to some embodiments of the present disclosure may further comprise a black matrix layer disposed on a side of the upper substrate facing the lower substrate, or disposed on a side of the lower substrate facing the upper substrate.

An orthogonal projection of a separation gap between two adjacent self-capacitance electrodes on the lower substrate is located in a region where a pattern of the black matrix layer is located.

An orthogonal projection of a pattern of each wire on the lower substrate is located in the region where the pattern of the black matrix layer is located.

In addition, some embodiments of the present disclosure further provide a display apparatus comprising a touch display panel according to some embodiments of the present disclosure. The display apparatus may be any product or component having a display function such as a mobile phone, a tablet computer, a television, a display, a notebook computer, a digital photo frame, a navigator etc. Implementations of the display apparatus may be known with reference to the embodiments of the In Cell Touch Panel described above, and details are not repeated herein.

In addition, some embodiments of the present disclosure further provide a method for driving a touch display panel, comprising:

during displaying, scanning pixels in the touch display panel progressively; and applying a common electrode signal to each row of self-capacitance electrodes only when pixels corresponding to the corresponding row of self-capacitance electrodes are scanned.

In the method for driving a touch display panel according to some embodiments of the present disclosure, a timing of applying a common electrode signal to various rows of self-capacitance electrodes is controlled, that is, a common electrode signal is applied to each row of self-capacitance electrodes only when pixels corresponding to the corresponding row of "self-capacitance electrodes" are scanned, which reduces an amount of data required to be processed by the driving circuit, thereby simplifying a design of the driving circuit and saving the production cost.

In addition, the method according to some embodiments of the present disclosure may further comprise:

during touching, determining a touch position by detecting a change in a capacitance value of each "self-capacitance electrode".

When a human body does not touch the screen, each "self-capacitance electrode" has a fixed capacitance value, and when the human body touches the screen, the corresponding self-capacitance electrode has a capacitance value which is equal to a fixed capacitance value plus a capacitance value of the human body, and the driving chip may determine a touch position by detecting a change in a capacitance value of each "self-capacitance electrode" in a timing period of the touch.

In a specific implementation, in the method according to some embodiments of the present disclosure, each row of self-capacitance electrodes corresponds to n rows of pixels, where n is an integer greater than or equal to 1, and the method specifically comprises:

during displaying, scanning pixels in the touch display panel progressively, and applying a common electrode signal to each row of self-capacitance electrodes only when n rows of pixels corresponding to the corresponding row of self-capacitance electrodes are scanned.

It will be apparent that those skilled in the art can make various modifications and variations in the present disclosure without departing from the spirit and scope of the disclosure. Thus, if these modifications and variations of the present disclosure fall within the scope of the claims of the present disclosure and their equivalent technologies, the present disclosure also intends to include these modifications and variations.

I claim:

1. A method for driving a touch display panel, wherein the touch display panel comprises:
   an upper substrate;
   a lower substrate disposed opposite to the upper substrate;
   a plurality of pixels located between the upper substrate and the lower substrate and arranged in a matrix;
   a common electrode layer located between the upper substrate and the lower substrate and divided into a plurality of self-capacitance electrodes which are independent of each other;
   a driving chip connected to the self-capacitance electrodes through corresponding wires, respectively; and
   a plurality of compensation capacitors coupled to the corresponding wires, respectively, each compensation capacitor having a capacitance value inversely related to a length of a corresponding wire, wherein a portion of a wire is multiplexed as a first electrode of a corresponding compensation capacitor,
   the method comprising:
   during displaying, scanning, by the driving chip, pixels in the touch display panel progressively, and applying a common electrode signal to each row of self-capacitance electrodes only when pixels corresponding to the corresponding row of self-capacitance electrodes are scanned.

2. The method according to claim 1, further comprising:
   during touching, determining a touch position by detecting a change in a capacitance value of each self-capacitance electrode.

3. The method according to claim 1, wherein the touch display panel further comprises:
   a plurality of compensation resistors electrically connected to the plurality of wires, respectively, and a resistance value of each compensation resistor is inversely related to a length of a corresponding wire.

4. The method according to claim 1, wherein each row of self-capacitance electrodes corresponds to n rows of pixels, where n is an integer greater than or equal to 1, and the method further comprises:
   during displaying, scanning pixels in the touch display panel progressively, and applying a common electrode signal to each row of self-capacitance electrodes only when n rows of pixels corresponding to the corresponding row of self-capacitance electrodes are scanned.

5. A touch display panel, comprising:
an upper substrate;
a lower substrate disposed opposite to the upper substrate;
a plurality of pixels located between the upper substrate and the lower substrate and arranged in a matrix;
a driving chip configured to scan a plurality of pixels progressively;
a common electrode layer located between the upper substrate and the lower substrate and divided into a plurality of self-capacitance electrodes which are independent of each other, wherein the self-capacitance electrodes are connected to the driving chip through corresponding wires, respectively; and
a plurality of compensation capacitors coupled to the corresponding wires, respectively, each compensation capacitor having a capacitance value inversely related to a length of a corresponding wire, wherein a portion of a wire is multiplexed as a first electrode of a corresponding compensation capacitor,
wherein the driving chip is further configured to apply a common electrode signal to each row of self-capacitance electrodes only when pixels corresponding to the corresponding row of self-capacitance electrodes are in a scanning state.

6. The touch display panel according to claim 5, wherein each row of self-capacitance electrodes corresponds to multiple rows of pixels.

7. The touch display panel according to claim 6, wherein various rows of self-capacitance electrodes correspond to the same number of rows of pixels, respectively.

8. The touch display panel according to claim 5, further comprising:
a plurality of compensation resistors electrically connected to the plurality of wires, respectively, and a resistance value of each compensation resistor is inversely related to a length of a corresponding wire.

9. The touch display panel according to claim 5, wherein first electrodes of the compensation capacitors are arranged in the same layer as that of the wires.

10. The touch display panel according to claim 9, wherein the wires are disposed in a different layer from that of the self-capacitance electrodes, and second electrodes of the compensation capacitors are disposed in the same layer as that of the self-capacitance electrodes.

11. The touch display panel according to claim 9, wherein the wires are disposed in the same layer as that of the self-capacitance electrodes, and second electrodes of the compensation capacitors are disposed in a different layer from that of the self-capacitance electrodes.

12. The touch display panel according to claim 5, further comprising:
data lines extending in the same direction as that of the wires.

13. The touch display panel according to claim 12, wherein the wires are disposed in the same layer as that of the data lines and are insulated from the data lines.

14. The touch display panel according to claim 5, wherein the driving chip is further configured to determine a touch position by detecting a change in a capacitance value of each self-capacitance electrode during touching.

15. A display apparatus comprising a touch display panel according to claim 5.

16. The touch display panel according to claim 5, wherein the wires are disposed in a different layer from that of the self-capacitance electrodes, and second electrodes of the compensation capacitors are disposed in the same layer as that of the self-capacitance electrodes.

17. The touch display panel according to claim 5, wherein the wires are disposed in the same layer as that of the self-capacitance electrodes, and second electrodes of the compensation capacitors are disposed in a different layer from that of the self-capacitance electrodes.

* * * * *